(12) United States Patent
Park et al.

(10) Patent No.: US 10,388,068 B2
(45) Date of Patent: Aug. 20, 2019

(54) SYSTEM AND METHOD OF AUGMENTED REALITY ALARM SYSTEM INSTALLATION

(71) Applicant: Honeywell International Inc., Morristown, NJ (US)

(72) Inventors: Arthur Tony Park, Kilmarnock (GB); Russell Raeside, Motherwell (GB); Robert John Probin, Glasgow (GB)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 14/330,130

(22) Filed: Jul. 14, 2014

(65) Prior Publication Data

US 2016/0012639 A1 Jan. 14, 2016

(51) Int. Cl.
| | | |
|---|---|---|
| *G06F 16/58* | (2019.01) | |
| *G06F 3/14* | (2006.01) | |
| *G06T 19/00* | (2011.01) | |
| *G06F 3/0484* | (2013.01) | |
| *G06F 16/955* | (2019.01) | |
| *G08B 25/14* | (2006.01) | |

(52) U.S. Cl.
CPC ........ *G06T 19/006* (2013.01); *G06F 3/04845* (2013.01); *G06F 3/1454* (2013.01); *G06F 16/5866* (2019.01); *G06F 16/9554* (2019.01); *G08B 25/14* (2013.01); *G09G 2370/022* (2013.01)

(58) Field of Classification Search
CPC . G06T 19/006; G08B 25/14; G06F 17/30268; G06F 17/30879; G06F 3/147; G06F 3/04845; G06F 17/30861; G06F 17/30864; G06F 16/5866; G06F 16/60; G06F 3/1454; H04N 1/00161; H04N 1/00164; G05B 15/02; G09G 2370/022; G09G 5/003
USPC .......... 345/629, 632–633; 398/187; 340/332, 340/691.6; 709/217
See application file for complete search history.

(56) References Cited

U.S. PATENT DOCUMENTS

| | | | |
|---|---|---|---|
| 8,646,000 B2* | 2/2014 | Kang .................... | G06F 3/0482 345/633 |
| 9,240,058 B1* | 1/2016 | Amacker ................ | G06T 11/00 |
| 2004/0161246 A1* | 8/2004 | Matsushita ............. | G06F 3/002 398/187 |

(Continued)

FOREIGN PATENT DOCUMENTS

| | | |
|---|---|---|
| CN | 1867142 A | 11/2006 |
| CN | 102394926 A | 3/2012 |

(Continued)

OTHER PUBLICATIONS

Extended European search report for corresponding EP patent application 15173029.8, dated Nov. 10, 2015.

(Continued)

*Primary Examiner* — Chante E Harrison
(74) *Attorney, Agent, or Firm* — Husch Blackwell LLP

(57) ABSTRACT

Systems and methods of augmented reality alarm system installation are provided. Methods can include capturing an image of a first piece of information displayed on a first user interface, identifying and retrieving a second piece of information associated with the first piece of information, and displaying the second piece of information on a second user interface.

2 Claims, 2 Drawing Sheets

(56) References Cited

U.S. PATENT DOCUMENTS

| | | | |
|---|---|---|---|
| 2004/0172222 A1* | 9/2004 | Simpson | G06F 19/3418 702/189 |
| 2004/0256465 A1* | 12/2004 | Longacre, Jr. | G06K 7/10544 235/462.49 |
| 2005/0055244 A1* | 3/2005 | Mullan | G06F 19/3418 705/2 |
| 2006/0232399 A1* | 10/2006 | Martin | G08B 25/14 340/539.16 |
| 2008/0303643 A1* | 12/2008 | Ishida | H04M 1/6058 340/332 |
| 2010/0259549 A1* | 10/2010 | Brown | G06F 21/36 345/589 |
| 2011/0014975 A1* | 1/2011 | Grabiec | G07F 17/34 463/25 |
| 2011/0138416 A1 | 6/2011 | Kang et al. | |
| 2012/0023167 A1* | 1/2012 | Hovdal | G06K 7/1095 709/204 |
| 2012/0169454 A1* | 7/2012 | Petersen | G08B 1/08 340/4.1 |
| 2012/0217292 A1* | 8/2012 | Gratton | G06F 17/30879 235/375 |
| 2012/0223968 A1* | 9/2012 | Kashimoto | G06T 11/00 345/633 |
| 2012/0249588 A1* | 10/2012 | Tison | G06F 1/1696 345/633 |
| 2013/0031202 A1* | 1/2013 | Mick | G06Q 10/06 345/629 |
| 2013/0127980 A1* | 5/2013 | Haddick | G06F 3/013 348/14.08 |
| 2013/0326407 A1* | 12/2013 | van Os | G01C 21/00 715/810 |
| 2014/0159910 A1* | 6/2014 | Lee | G08B 7/066 340/691.6 |
| 2014/0299662 A1* | 10/2014 | Harrison | G06F 17/30879 235/380 |
| 2015/0085128 A1* | 3/2015 | Pineau | G08B 13/19608 348/150 |
| 2015/0188724 A1* | 7/2015 | Kim | G06F 3/048 340/3.71 |
| 2015/0224330 A1* | 8/2015 | Kaib | G08B 21/0453 607/7 |
| 2015/0286857 A1* | 10/2015 | Kim | G06F 17/30247 382/118 |
| 2015/0347740 A1* | 12/2015 | O'Malley | G06F 21/36 726/4 |
| 2016/0342839 A1* | 11/2016 | Condel | G06K 9/00671 |
| 2017/0076504 A1* | 3/2017 | Oar | G02B 27/017 |
| 2017/0094042 A1* | 3/2017 | Dagit, III | H04M 1/72533 |

FOREIGN PATENT DOCUMENTS

| | | | | |
|---|---|---|---|---|
| CN | 102625219 A | 8/2012 | | |
| CN | 103024063 A | 4/2013 | | |
| CN | 103221963 A | 7/2013 | | |
| CN | 103430565 A | 12/2013 | | |
| EP | 2 575 291 A2 | 4/2013 | | |
| JP | WO 2014050147 A1 * | 4/2014 | | G06F 3/04883 |
| WO | WO 2013/046231 A1 | 4/2013 | | |

OTHER PUBLICATIONS

Jennifer Van Grove, City of New York Blankets Times Square with Giant QR Codes, Jun. 10, 2010, http://mashable.com/2010/06/10/internet-week-qr-codes/#Ifv7x2qsi8qT.

Roger, QR Code on the World's Largest HDTV, Sep. 7, 2009, http://2d-code.co.uk/hdtv-qr-code/.

Fare Compare, The QR Code for Airport Check-In: How Does It Work?, Aug. 29, 2012, http://www.farecompare.com/travel-advice/the-qr-code-for-airport-check-in-how-does-it-work/#/.

Gordon Povey, Augmented Reality using VLC, Visible Light Communication is an ideal technology to enable Augmented Reality applications for indoor environments, Jul. 12, 2012, http://visiblelightcomm.com/augmented-reality-using-vlc/.

European examination report for corresponding EP patent application 15173029.8, dated Oct. 26, 2016.

First Office Action from corresponding CN patent application 201510406906.8, dated May 5, 2019.

English-language translation of First Office Action from corresponding CN patent application 201510406906.8, dated May 5, 2019.

English-language translation of CN patent publication 1867142, dated Nov. 22, 2006.

English-language translation of CN patent publication 102394926, dated Mar. 28, 2012.

English-language translation of CN patent publication 1102625219, dated Aug. 1, 2012.

English-language translation of CN patent publication 103024063, dated Apr. 3, 2013.

English-language translation of CN patent publication 103221963, dated Jul. 24, 2013.

English-language translation of CN patent publication 103430565, dated Dec. 4, 2013.

* cited by examiner

SYSTEM AND METHOD OF AUGMENTED REALITY ALARM SYSTEM INSTALLATION

FIELD

The present invention relates generally to installation of alarm systems. More particularly, the present invention relates to a system and method of augmented reality alarm system installation.

BACKGROUND

Installing a commercial alarm system is a complex process that is often undertaken via a simple user interface that consists of a keypad with sixteen keys and a 2×16 character alphanumeric LCD display. However, in some cases, such a display is insufficient to present and provide fully satisfactory feedback regarding the installation process. Furthermore, in all cases, it is impossible to display explanatory text on such a display.

In view of the above, there is a continuing, ongoing need for an improved system and method for alarm system installation.

DETAILED DESCRIPTION

Figure 1:
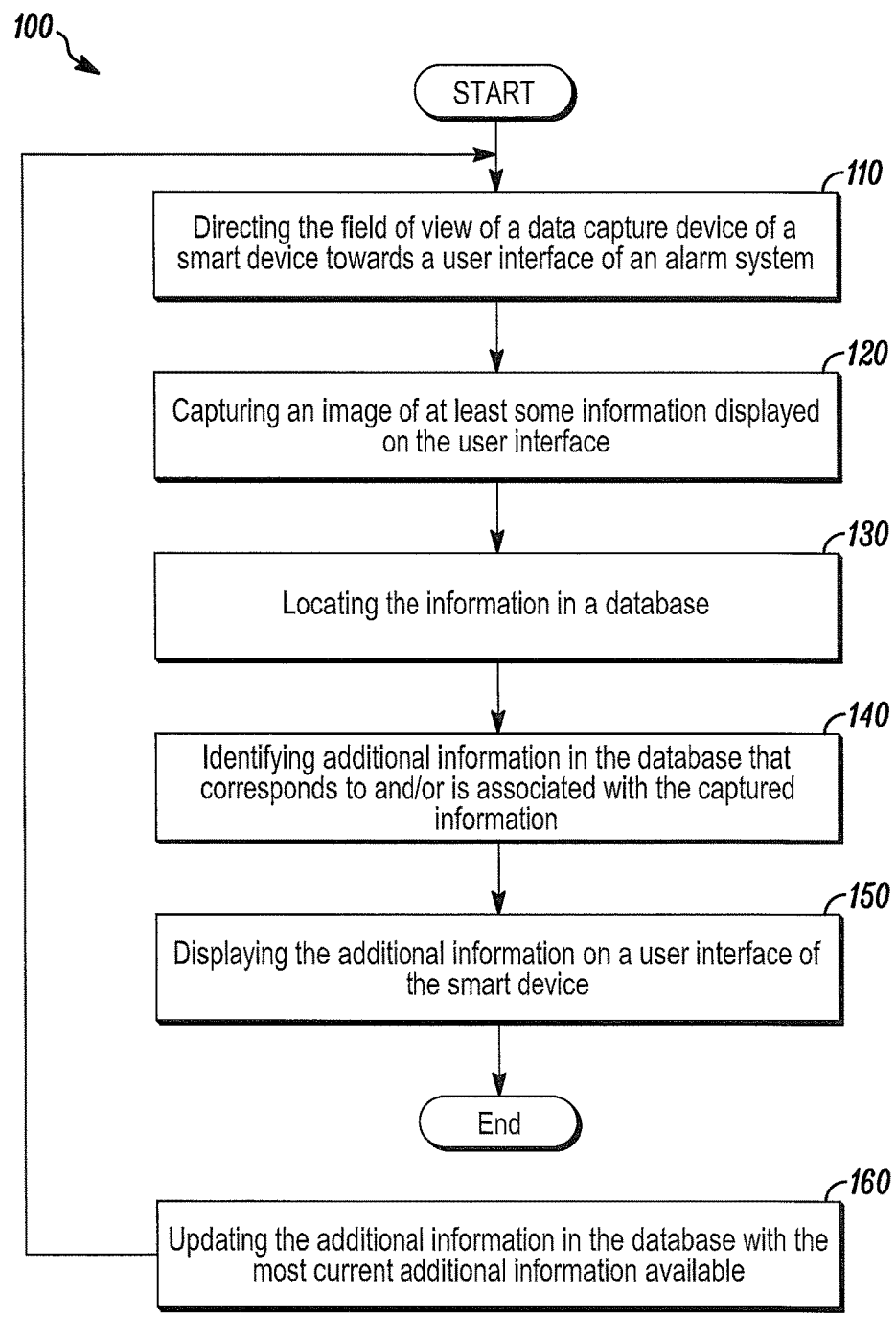
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a system and method of augmented reality alarm system installation. Embodiments disclosed herein also include a system and method of assisting an end user to perform operations on the alarm system. However, it is to be understood that systems and methods disclosed herein do not limit the alarm system or the alarm system user interface. For example, the alarm system can be installed and configured independently of the systems and methods disclosed herein, and the alarm system user interface can function independently of the systems and methods disclosed herein.

Some embodiments disclosed herein can provide context specific installation help, on demand, by employing a smart phone, tablet device, or other personal digital assistant that includes a camera or other data capture device. A user, for example, an installation engineer, can direct the field of view of the camera at an alarm system's user interface, for example, a 2×16 alphanumeric LCD display, to read at least one aspect of the display and to capture the status of the display. Based on the captured status of the display, systems and methods disclosed herein can identify the status of the alarm system, including the installation thereof, and provide additional information related to that status, for example, installation instructions, hints, and/or user tips.

In some embodiments, systems and methods disclosed herein can capture the status of the alarm system display by instructing the camera to capture the entire display, for example, by capturing and reading all of the text on the display.

In some embodiments, the alarm system display can display short numeric, alphanumeric, or symbolic code on the display, for example, at the end of the display. In these embodiments, systems and methods disclosed herein can capture the status of the alarm system display by instructing the camera to capture and read the code.

In some embodiments, the alarm system display can display a user-defined graphic, for example, a two-dimensional bar code or QR code. In these embodiments, systems and methods disclosed herein can capture the status of the alarm system display by instructing the camera to capture and read the graphic.

In some embodiments, the alarm system can include a keypad with a light emitting diode (LED) or other visual indicator. In these embodiments, the keypad LED or other visual indicator can be modulated, and systems and methods disclosed herein can capture the status of the alarm system by instructing the camera to capture the modulation. Accordingly, in these embodiments, systems and methods disclosed herein can capture the status of the alarm system without capturing the status of the alarm system display itself.

Additionally or alternatively, the alarm system's keypad, display, or other user interface can include a sounder, speaker, or other audio indicator. In these embodiments, sound emitted from the sounder, speaker, or other audio indicator can be modulated, and systems and methods disclosed herein can capture the status of the alarm system by instructing a microphone of the user's smart phone, tablet device, or other personal digital assistant to capture the modulation. Accordingly, in these embodiments, systems and methods disclosed herein can capture the status of the alarm system without capturing any visual images.

In accordance with disclosed embodiments, a software application can run on a smart phone, tablet device, or other personal digital assistant that includes an onboard camera or other data capture device for capturing an image of an alarm system display and/or keypad. Furthermore, the software application can interpret the captured image and/or captured modulation to identify and display corresponding additional information.

In accordance with disclosed embodiments, a server can store the corresponding additional information, for example, in a database, and the corresponding additional information can be identified by cross-referencing the information in the captured image. In some embodiments, the server can run locally on the smart phone, tablet device, or other personal digital assistant. However, in some embodiments, the server can include a remote server that can be accessed in real time, via wireless communication, by the smart phone, tablet device, or other personal digital assistant.

FIG. 1 is a flow diagram of a method 100 in accordance with disclosed embodiments. As seen in FIG. 1, the method 100 can include directing the field of view of a data capture device of a smart device towards a user interface of an alarm system as in 110. Then, the method 100 can include the data capture device capturing an image of at least some information displayed on the user interface as in 120.

After the image of the information displayed on the user interface is captured as in 120, the method 100 can include locating the information in a database as in 130 and identifying additional information in the database that corresponds to and/or is associated with the captured information as in 140. Then, the method 100 can include displaying the additional information on a user interface of the smart device as in 150.

In some embodiments, the method 100 can also include updating the additional information in the database with the most current additional information available that corresponds to information that can be displayed on the user interface of the alarm system as in 160. Accordingly, the method 100 can continuously provide current additional information rather than outdated information that may no longer be useful or relevant to a user.

Figure 2:
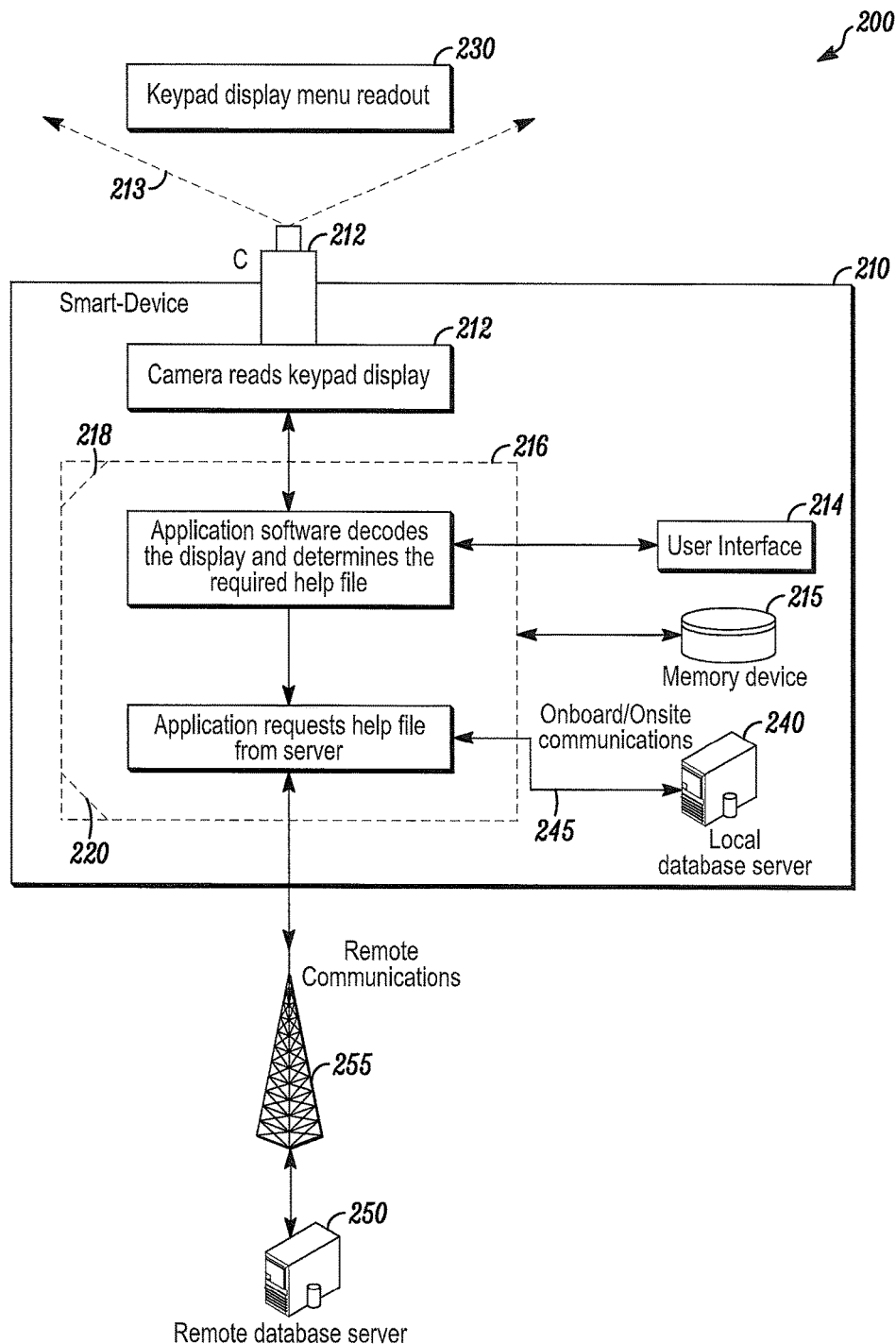
FIG. 2 is a block diagram of a system in accordance with disclosed embodiments.

FIG. 2 is a block diagram of a system 200 in accordance with disclosed embodiments. In some embodiments, the system 200 can execute the method 100 of FIG. 1 and others in accordance with disclosed embodiments.

The system 200 can include a smart device 210, for example, a smart phone, a tablet device, or other personal digital assistant. The smart device can include a data capture device 212, a user interface 214, a memory device 215, control circuitry 216, one or more programmable processors 218, and an executable control software application 220 as would be understood by one of ordinary skill in the art. The executable control software application 220 can be stored on a transitory or non-transitory local computer readable medium, including, but not limited to, local computer memory, RAM, optical storage media, magnetic storage media, flash memory, and the like. In some embodiments, the control circuitry 216, the programmable processors 218, and/or the executable control software application 220 can execute and control the method 100 and others in accordance with disclosed embodiments.

As seen, the data capture device 212 can be positioned so that a user interface 230 of an alarm system is in its field of view 213 and so that the data capture device 212 can capture an image of information displayed on the user interface 230, for example, a keypad or other display. For example, in some embodiments, the user interface 230 can display a menu associated with the alarm system, and the data capture device 212 can capture an image of the menu and/or a portion thereof.

The control circuitry 216, the programmable processor 218, and/or the executable control software application 220 can decode the information in the image captured by the data capture device 212. For example, the control circuitry 216, the programmable processor 218, and/or the executable control software application 220 can identify, determine, and/or locate an information file associated with the information in the image captured by the data capture device 212. In some embodiments, the control circuitry 216, the programmable processor 218, and/or the executable control software application 220 can access a database, for example, a database stored in a memory device 215 to identify, determine, and/or locate the information file associated with the information in the image captured by the data capture device 212. Then, the control circuitry 216, the programmable processor 218, and/or the control software application 220 can request the information file from a server 240 or 250.

In some embodiments, a server 240 can be stored locally on the smart device 210, and the control circuitry 216, the programmable processor 218, and/or the executable control software application 220 can communicate with the server 240 via an onboard and/or onsite communication means 245, for example, a communication bus or other communication means as would be known by one of ordinary skill in the art. However, in some embodiments, a server 250 can be located remotely from the smart device 210, and the control circuitry 216, the programmable processor 218, and/or the executable control software application 220 can communicate with the server 250 via remote communication means 255, for example, wireless communication means such as radio, WiFi, cellular, and the like, or wired communication means such as Ethernet, fiber optics, and the like.

The server 240 or 250 can transmit the requested information file to the control circuitry 216, the programmable processor 218, and/or the executable control software application 220 for displaying information in the requested information file on the user interface 214. Information files stored on the server 240 or 250 can be updated by a user periodically and/or as needed so that the information file transmitted to the control circuitry 216, the programmable processor 218, and/or the executable control software application 220 includes the most current information associated with the information in the image captured by the data capture device 212.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A system for an augmented reality alarm system installation comprising:
   a microphone;
   a user interface;
   a programmable processor; and
   executable control software stored on a non-transitory computer readable medium,
   wherein the programmable processor and the executable control software instruct the microphone to capture modulation of sound emitted from a sounder, a speaker, or another audio indicator of an alarm system,
   wherein the modulation represents a first piece of information,
   wherein the programmable processor and the executable control software identify and retrieve a second piece of information associated with the first piece of information by cross-referencing the first piece of information in a database that is stored on a server and by identifying and retrieving the second piece of information from the database,
   wherein the server is a remote device,
   wherein the programmable processor and the executable control software communicate with the server via remote communication, and
   wherein the programmable processor and the executable control software instruct the user interface to display the second piece of information.

2. A method for an augmented reality alarm system installation, the method comprising:
   instructing a microphone of a smart device to capture modulation of sound emitted from a sounder, a speaker, or another audio indicator of an alarm system, wherein the modulation represents a first piece of information;

identifying and retrieving a second piece of information associated with the first piece of information by cross-referencing the first piece of information in a database or on a server and by identifying and retrieving the second piece of information from the database or the server;

displaying the second piece of information on a user interface of the smart device; and updating the second piece of information stored in the database or on the server.

\* \* \* \* \*